Figure 1:
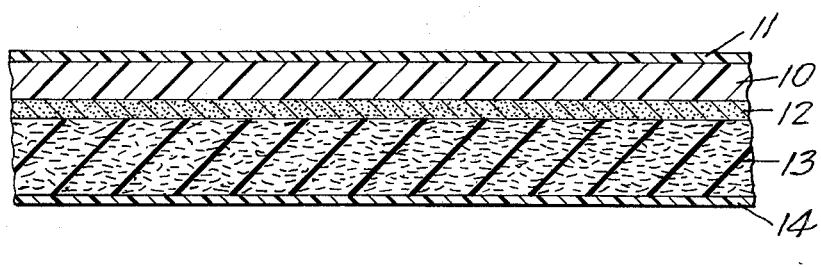

United States Patent [19]
Stigen

[11] 3,908,065
[45] Sept. 23, 1975

[54] MAGNETIC EMBOSSABLE LABEL TAPE LAMINATE

[75] Inventor: Merritt L. Stigen, Troy Twp., St. Croix County, Wis.

[73] Assignee: Minnesota Mining and Manufacturing Company, St. Paul, Minn.

[22] Filed: Apr. 15, 1974

[21] Appl. No.: 461,101

[52] U.S. Cl. .............. 428/329; 156/220; 428/156; 428/164; 428/323; 428/328; 428/900; 428/914
[51] Int. Cl.² ..................... B32B 5/16; B32B 3/00
[58] Field of Search .......... 161/DIG. 3, 406 T, 413, 161/254, 256, 406, 116, 218, 162, 168; 156/220, 209; 264/293; 117/239, 235

[56] References Cited
UNITED STATES PATENTS

| | | | |
|---|---|---|---|
| 2,709,148 | 5/1955 | Jacque | 156/276 X |
| 2,974,055 | 3/1961 | Scharf | 161/218 |
| 2,999,275 | 9/1961 | Blume | 264/172 |
| 3,036,945 | 5/1962 | Souza | 161/406 |
| 3,093,919 | 6/1963 | Holtz | 161/162 X |
| 3,310,421 | 3/1967 | Flowers | 161/162 X |
| 3,359,152 | 12/1967 | Blume | 161/162 |
| 3,468,744 | 9/1969 | Reinhart | 161/406 |

Primary Examiner—George F. Lesmes
Assistant Examiner—Ellis P. Robinson
Attorney, Agent, or Firm—Alexander, Sell, Steldt & DeLaHunt

[57] ABSTRACT

Embossable label tape laminate has a light-transmitting plastic layer which becomes opaque when embossed and an underlying flexible magnet layer by which labels severed from the tape laminate can be magnetically adhered to ferromagnetic objects. Characters can be embossed in the magnetic tape laminate using an ordinary tape-embossing gun.

6 Claims, 2 Drawing Figures

MAGNETIC EMBOSSABLE LABEL TAPE LAMINATE

FIELD OF THE INVENTION

The present invention concerns embossable plastic tape on which letters and numerals may be formed using an ordinary tape-embossing gun.

BACKGROUND TO THE INVENTION

Embossable plastic tape that provides visually attractive, durable labels has come into widespread use during the past 15 years. Typically, the backing of the tape comprises a transparent or translucent plastic layer which becomes opaque when embossed and a colored substrate which shows through the plastic layer except at the embossed areas, which appear white against the colored background. A layer of pressure-sensitive adhesive on the substrate is protected by a removable liner which is stripped away to permit the embossed tape to be adhered to objects to be labelled. Such a tape is disclosed in U.S. Pat. No. 3,036,945 (Sousa). As disclosed in U.S. Pat. No. 3,468,744 (Reinhart), the opacifying layer may have a transparent protective overlay which may be colored so that whitened embossed characters appear to have the color of the overlay which preferably contrasts to the combined color presented by the overlay and background.

Embossable plastic tape usually employs an aggressive adhesive so that the embossed labels do not come loose even when subjected to rough treatment. Consequently, the labels are difficult to remove without damaging the surface of the labelled object and may leave an unsightly adhesive residue. The originally attractive appearance of the labels is usually ruined by stress-whitening during removal.

To permit repositioning, embossed plastic labels have been adhered by their adhesive layers to flexible magnet strips which magnetically adhere to ferromagnetic objects. These embossed-plastic, magnet-strip composites can be readily moved from one ferromagnetic surface to another and have been employed to some extent for such uses as in bar-graph displays which require frequent updating.

THE PRESENT INVENTION

The present invention provides embossed labels which are similar in appearance to those provided by embossable plastic adhesive tape and, like the embossed-plastic magnet-strip composites of the prior art, magnetically adhere to and are freely repositionable about ferromagnetic objects. The embossed labels of the present invention are made from a tape laminate which, like embossable plastic tape of the prior art, includes a light-transmitting plastic layer which opacifies under deforming stresses, as in an ordinary tape-embossing gun. Adhesively bonded to the stress-opacifying plastic layer is a layer comprising permanent magnet particles and less than 40% by weight of a nonmagnetic binder so selected that the magnet-particle layer has a modulus of elasticity in tension of $0.1-1.0 \times 10^5$ psi and a $BH_{max}$ of at least $0.7 \times 10^6$ quass-oersteds in the direction perpendicular to its broad surfaces. Although this simple adhesively-bonded composite of a plastic layer and a magnet-particle layer could be used in a tape-embossing gun, the male dies of the gun would tend to stick to the magnet-particle layer and carry magnet particles away. To prevent this, the magnet-particle layer is protected by a durable base layer of rubber or plastic having a tensile strength of 1,500–6,500 psi and an elongation of 1–75%. In spite of the high proportion of magnet particles in the magnet-particle layer, tapes of this laminate provide embossed labels which have the same visually attractive outward appearance as do embossed plastic adhesive labels. By magnetizing the magnet-particle layer in the direction perpendicular to its broad surfaces, the embossed labels magnetically adhere strongly to ferromagnetic objects but can readily be repositioned.

The base layer may be as thick as about 20 micrometers if the magnet-particle layer is at least 300 micrometers in thickness. When a thinner magnet-particle layer is employed, the base layer is preferably somewhat thinner unless the magnet-particle layer has a higher $BH_{max}$ in the direction perpendicular to the surface of the tape laminate. In any event, the base layer should have a thickness of at least one micrometer to protect the magnet-particle layer adequately.

For the magnet-particle layer, one may employ a flexible magnet sheet prepared from single-domain size platelets of barium ferrite and vulcanizable rubber or thermoplastic resin (both of which are polymeric nonmagnetic binders) by the process disclosed in U.S. Pat. No. 2,999,275. In that process, the platelets are oriented to become generally parallel to the broad surfaces, thus imparting an easy direction of magnetization perpendicular to those surfaces. After the sheet has been formed, it may be calendered several times to reduce it to the desired thickness while the binder is in a workable state, e.g., before a rubber matrix is cured. Flexible magnet sheets of suitable thickness made by the process disclosed in U.S. Pat. No. 2,999,275 (Blume) are available commercially under the designation "Plastiform" PL-1 magnet sheet material which has a $BH_{max}$ of $1.0-1.1 \times 10^6$ gauss-oersteds in the direction perpendicular to its broad surfaces. A preferred flexible magnet sheet material, commercially available as "Plastiform" PL-1.4H, has a $BH_{max}$ of about $1.4 \times 10^6$ gauss-oersteds and when magnetized affords superior holding power to ferromagnetic objects.

THE DRAWING

Figure 2:
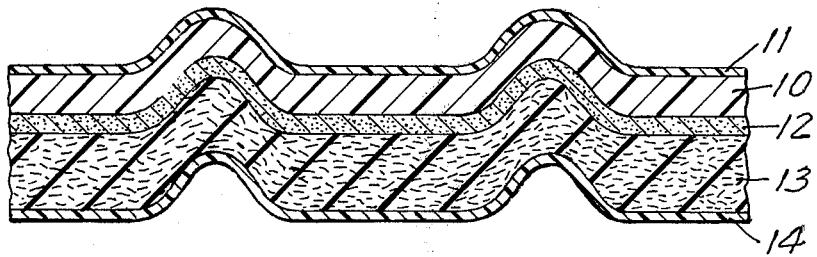

Referring to the drawing,

FIG. 1 is a schematic cross-section of a preferred tape of the present invention; and FIG. 2 is a cross-section showing the tape of FIG. 1 after is has been embossed.

The embossable label tape laminate shown in the drawing includes a transparent or translucent plastic layer 10 which opacifies at areas subjected to mild cold deformation such as clear rigid polyvinyl chloride. A plasticized vinyl resin provides a smooth, tough overlay 11 which may be of the type disclosed in U.S. Pat. No. 3,468,744. A magnet-particle layer 13 is bonded to the opposite surface of the layer 10 by a pressure-sensitive adhesive layer 12. A durable base layer 14 such as a vinyl resin containing about 10–30 percent plasticizer protects the other surface of the magnet-particle layer 13.

For use in presently available embossing guns, the following ranges of thicknesses may be used:

| | Thickness in micrometers |
|---|---|
| Plastic layer 10 | 25 – 250 |
| Protective overlay 11 | 0 – 20 |

-Continued

|  | Thickness in micrometers |
| --- | --- |
| Adhesive layer 12 | 10 – 100 |
| Magnet-particle layer 13 | 200 – 750 |
| Durable base layer 14 | 1 – 20 |
| Total label tape laminate | 250 – 800 |

Preferred thicknesses are:

|  | Thickness in micrometers |
| --- | --- |
| Plastic layer 10 | 100 – 200 |
| Protective overlay 11 | 10 – 15 |
| Adhesive layer 12 | 10 – 30 |
| Magnet-particle layer 13 | 300 – 450 |
| Durable base layer 14 | 10 – 15 |
| Total label tape laminate | 450 – 650 |

If each of the layers 10, 11 and 12 is transparent and colorless, the magnet-particle layer 13 provides the background color which may be a rich brown against which whitened characters formed in the plastic layer 10 upon embossing will stand out sharply. To provide variations in background colors, the plastic layer 10 and/or the pressure-sensitive adhesive layer 12 may be colored. To mask out the brown color of the magnet-particle layer 13, an opaque color-imparting layer, preferably 10–20 micrometers in thickness, may be added between the plastic layer 10 and the adhesive layer 12.

Employed in the following example was a flexible magnet-particle sheet available commercially under the trade designation "Plastiform" PL-1. More specifically, the magnet-particle sheet comprised by weight 1,015 parts barium ferrite platelets of approximately single-domain size and 100 parts of an uncured ethylene propylene nonconjugated diene rubber ("Nordel" 1070). The magnet-particle sheet had been reduced from an original thickness of 0.75 mm to a preferred thickness of 0.35 mm on a three-roll calender. Also employed was an unoriented, unplasticized clear polyvinyl chloride film having a thickness of about 110–120 micrometers. Such a film is widely used for embossable plastic tape because of its stress-whitening properties.

EXAMPLE

To one surface of the polyvinyl chloride film was applied a thin coating of a blue vinyl ink obtained by diluting MRX-17471 Roto Blue ink (sold by Crescent Ink and Color Company) with methyl ethyl ketone, methyl isobutyl ketone and toluene to 36%. The diluted ink had a viscosity of 20 seconds when measured in a Zahn G-3 open cup viscometer of the type commonly employed in the ink industry. The ink was knife-coated onto the surface of the polyvinyl chloride film and dried for 5 minutes at 60°C in a circulating-air oven to provide a blue-colored opacifying layer about 5 micrometers in thickness. Over the blue opacifying layer was applied a 50/50 ethyl acetate/toluol solution of 80:10 isooctyl acrylate:acrylic acid copolymer which upon drying in a circulating-air oven provided a pressure-sensitive adhesive coating about 50 micrometers in thickness. The magnet-particle sheet was laid on the adhesive coating and secured by several passes of a rubber-covered roll under hand pressure. To the exposed surface of the magnet-particle material was applied a coating of VMCH (25% solids in methyl ethyl ketone) and 20 parts by weight butylbenzylphthalate plasticizer per 100 parts VMCH using a 0.7-mm diameter Meyer-bar to provide, after drying at 50°C, a durable base layer about 12–15 micrometers in thickness. VMCH is an inter-polymer of 86 parts by weight of vinyl chloride, 13 parts vinyl acetate and one part of a dibasic acid.

The resulting tape laminate (which had an overall thickness of about 500 micrometers) was magnetized in a direction perpendicular to its broad surfaces to provide three alternating north and south poles per cm of width extending the full length of the laminate. The magnetized laminate when slit in the lengthwise direction to 1.3-cm widths was embossed in an ordinary tape-embossing gun to provide attractive labels having white-on-blue characters. The durable base layer in conjunction with the drive mechanisms of typical tape embossing guns provided good traction (without slippage) without leaving residue on the drive mechanisms. The labels remained firmly adhered when placed on ferromagnetic objects such as steel file cabinets but were readily repositioned without disturbing their attractive appearance.

Another material which provided a satisfactory durable base layer was "Acrysol" ASE-60, a highly cross-linked acrylic polymer applied from emulsion. A hard-finish floor wax has also been used.

I claim:

1. An embossable tape laminate including a light-transmitting plastic layer which is selectively opacified under deforming stresses to provide attractive labels, which plastic layer is bonded by an adhesive layer to a magnetized layer comprising permanent magnet particles and 9–40% by weight of polymeric nonmagnetic binder, which magnet-particle layer has a modulus of elasticity in tension of $0.1–1.0 \times 10^5$ psi and a $BH_{max}$ of at least $0.7 \times 10^6$ gauss-oersteds and, adhered to the magnet-particle layer, a durable base layer of rubber or plastic having a tensile strength of 1,500–6,500 psi and an elongation of 1–75%, the thickness of said tape and layers being within the following ranges:

|  | Thickness in micrometers |
| --- | --- |
| Stress-opacifying plastic layer | 25 – 250 |
| Adhesive layer | 10 – 100 |
| Magnet-particle layer | 200 – 750 |
| Durable base layer | 1 – 20 |
| Overall tape laminate | 250 – 800 | said tape laminate being embossable in an ordinary tape-embossing gun to provide attractive labels which magnetically adhere to ferromagnetic objects to be labelled.

2. An embossable tape laminate as defined in claim 1 wherein said adhesive layer is a pressure-sensitive adhesive.

3. An embossable tape laminate as defined in claim 1 and further including an opaque color-imparting layer between the stress-opacifying plastic layer and the adhesive layer.

4. An embossable tape laminate as defined in claim 1 wherein said adhesive layer is essentially 80:10 isooctyl acrylate:acrylic acid copolymer.

5. An embossable tape laminate comprising the following layers adhered together in the following order: a light-transmitting plastic layer which is selectively opacified under deforming stresses, an opaque color-imparting layer, a pressure-sensitive adhesive layer, a magnetized layer comprising permanent magnet particles and 9–40% by weight of polymeric nonmagnetic binder, which magnet-particle layer has a modulus of elasticity in tension of $0.1$–$1.0 \times 10^5$ psi and a $BH_{max}$ of at least $1.0 \times 10^6$ gauss-oersteds, and a durable base layer of rubber or plastic having a tensile strength of 1,500–6,500 psi and an elongation of 1–75%, the thickness of said layers and overall tape laminate being within the following ranges:

|  | Thickness in micrometers |
|---|---|
| Stress-opacifying plastic layer | 100 – 200 |
| Opaque color-imparting layer | 10 – 20 |
| Adhesive layer | 10 – 30 |
| Magnet-particle layer | 300 – 450 |

—Continued

|  | Thickness in micrometers |
|---|---|
| Durable base layer | 10 – 15 |
| Overall tape laminate | 450 – 650 | said tape laminate being embossable in an ordinary tape-embossing gun to provide attractive labels which magnetically adhere to ferromagnetic objects to be labelled.

6. An embossable tape laminate as defined in claim 5 wherein said adhesive layer is essentially 80:10 isooctyl acrylate:acrylic acid copolymer and said nonmagnetic binder consists essentially of polymeric binder material and comprises about 9–40% by weight of the magnet-particle layer, and said opaque color-imparting layer is a vinyl ink.

\* \* \* \* \*